United States Patent [19]

Tigner

[11] 4,138,460
[45] Feb. 6, 1979

[54] METHOD FOR FORMING TUBESHEETS ON HOLLOW FIBER TOWS AND FORMING HOLLOW FIBER BUNDLE ASSEMBLIES CONTAINING SAME

[75] Inventor: Reuben A. Tigner, Bay City, Mich.

[73] Assignee: Cordis Dow Corp., Miami, Fla.

[21] Appl. No.: 805,602

[22] Filed: Jun. 10, 1977

[51] Int. Cl.² .......................... B29C 6/04; B29F 1/10
[52] U.S. Cl. .................................. 264/159; 264/251; 264/261; 264/263; 264/271; 264/328
[58] Field of Search ............ 210/321 R, 22 R, 500 R, 210/506, 503–505, 508; 264/157, 159, 146, 271, 328, 259, 261, 263, 271, 258

[56] References Cited

U.S. PATENT DOCUMENTS

| | | | |
|---|---|---|---|
| 2,436,984 | 3/1948 | Wilson | 264/263 |
| 3,142,716 | 7/1964 | Gardenor | 264/272 |
| 3,671,622 | 6/1972 | Humphries | 264/263 |
| 3,730,959 | 5/1973 | Horres et al. | 264/263 |
| 3,884,814 | 5/1975 | Vogt et al. | 264/263 |
| 3,961,010 | 6/1976 | Holmes | 264/317 |

Primary Examiner—W.E. Hoag
Attorney, Agent, or Firm—Neal A. Waldrop

[57] ABSTRACT

A method of potting in a single or multi-cavity mold a plurality of fibers in continuous tow form to encapsulate the fibers, fill the interstices and form a solid tubesheet of selected shape and length. After transversely cutting through the thus formed tubesheet and the fibers therein a pair of tubesheets are formed each attached to and forming the end portion of a length of fibers. Potting at spaced longitudinal locations on the continuous tow, and transverse cutting, produces fiber bundle assemblies having a length of the tow of hollow fibers between a pair of axially spaced tubesheets. The process is semi-continuous or continuous, as desired.

18 Claims, 10 Drawing Figures

U.S. Patent  Feb. 6, 1979  Sheet 1 of 3  4,138,460
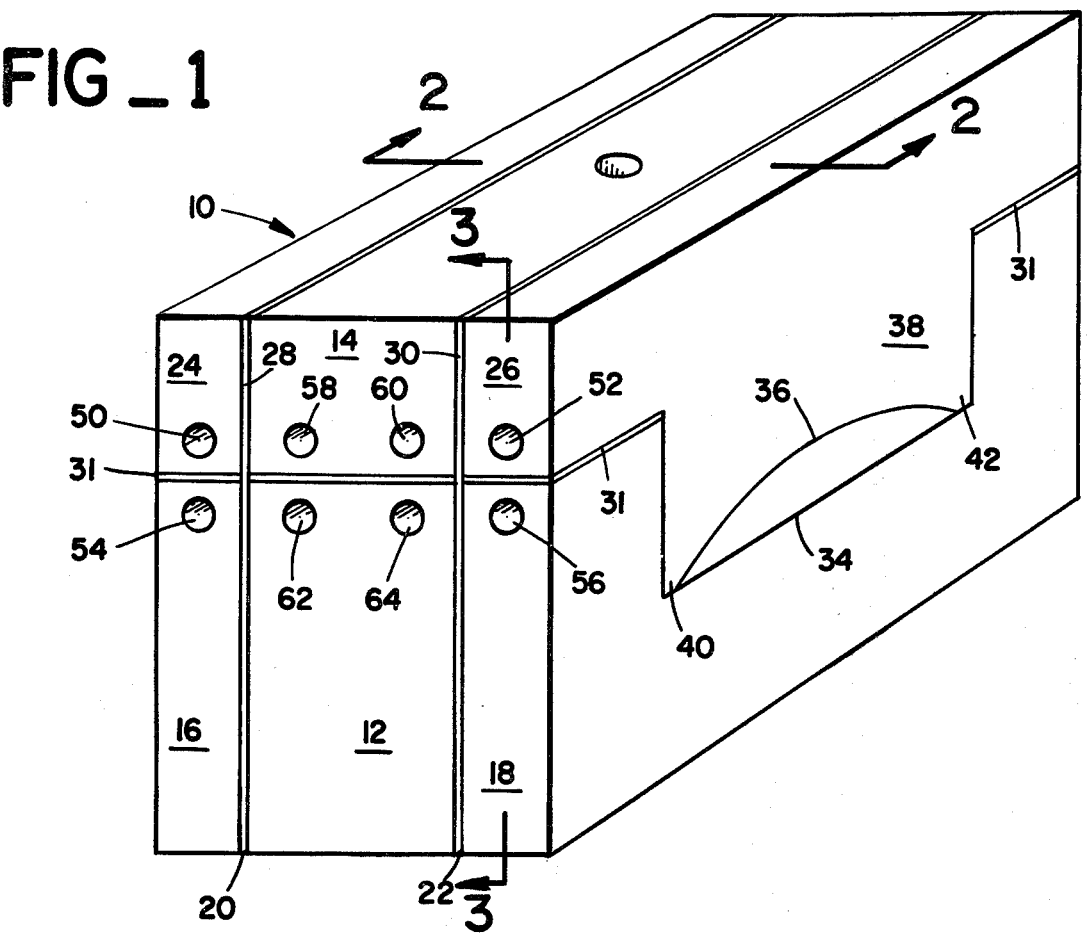
FIG_1
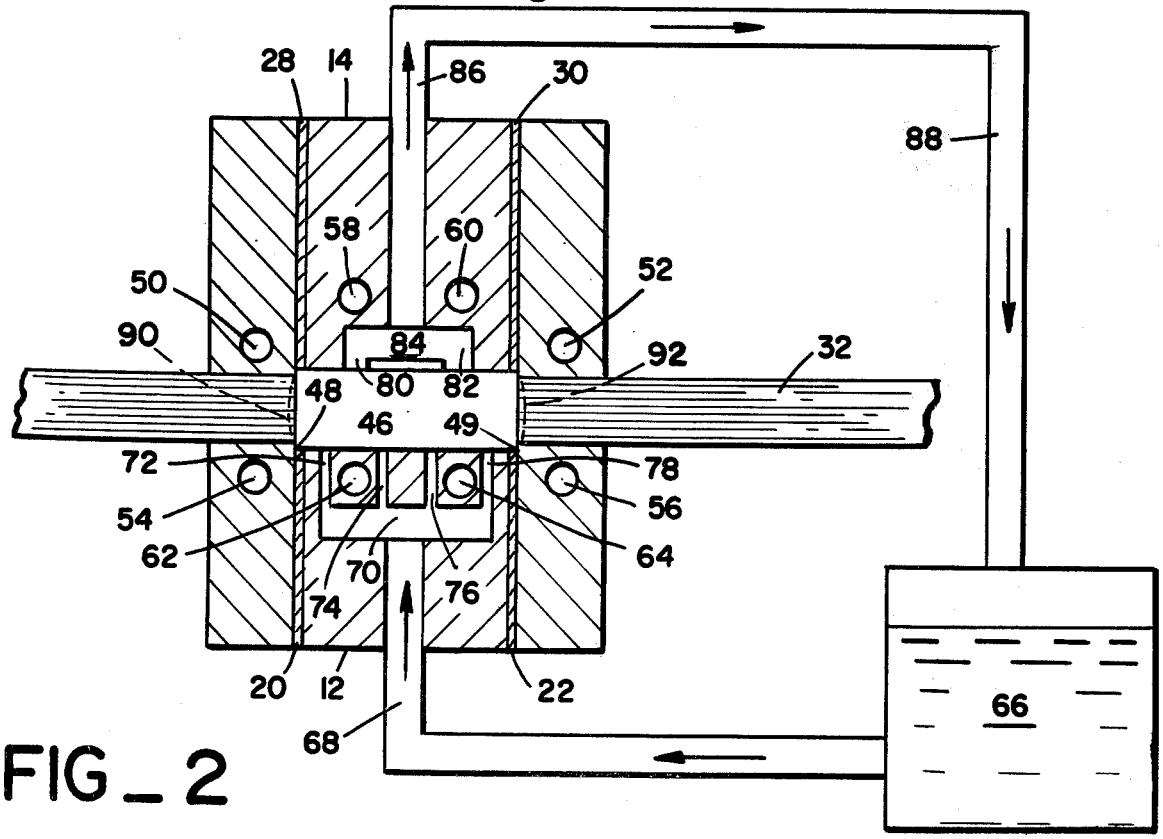
FIG_2

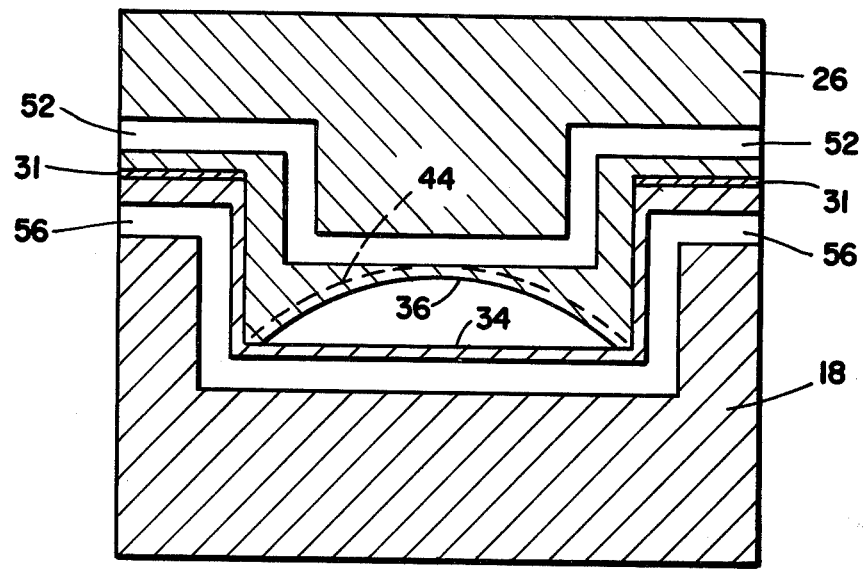
FIG_3
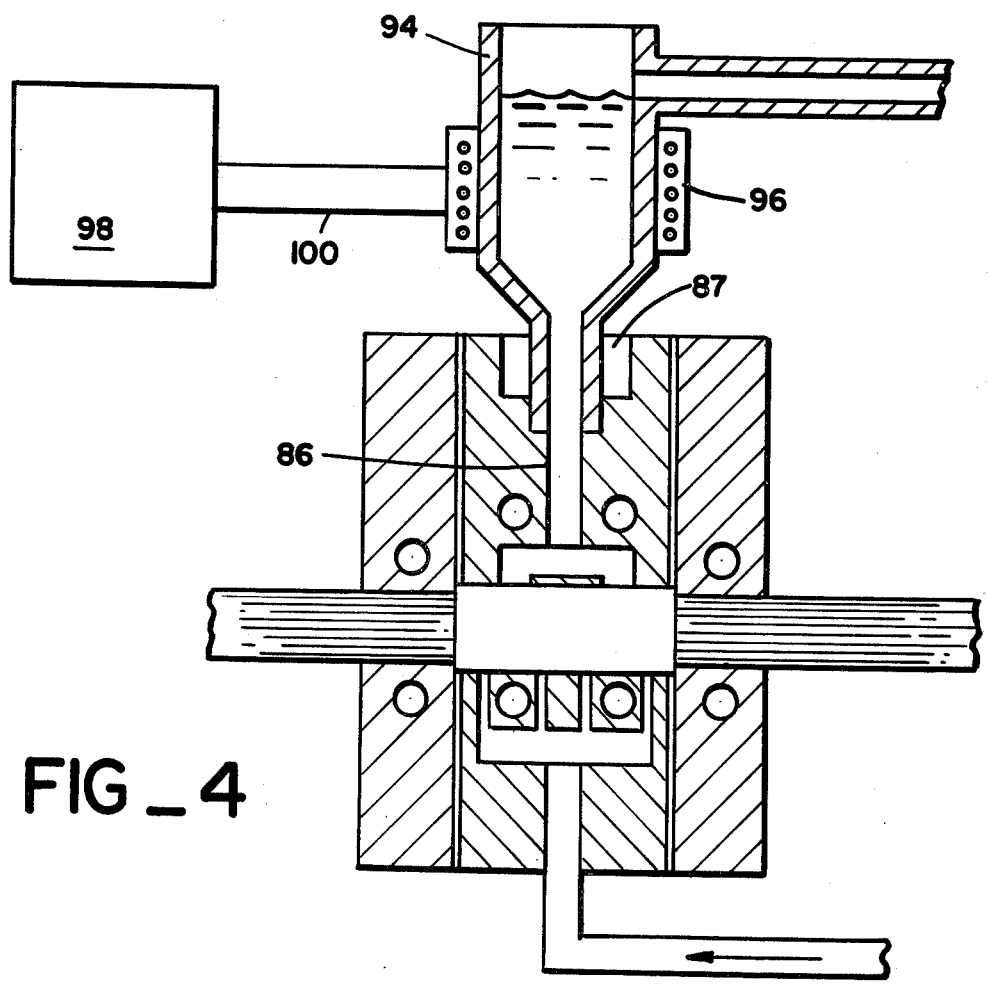
FIG_4

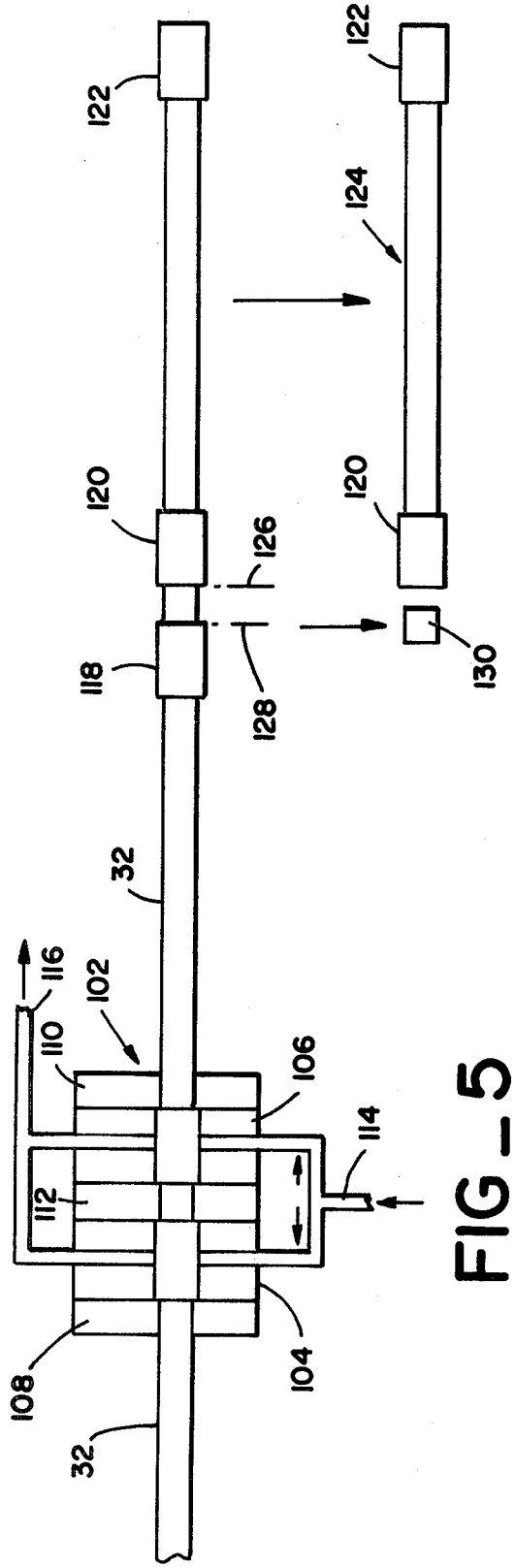
FIG_5
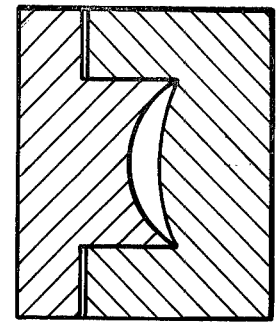
FIG_10
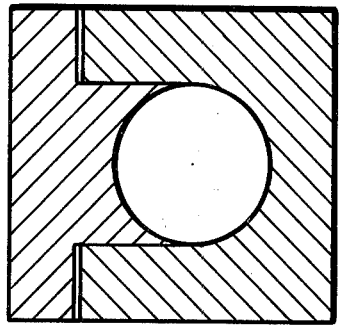
FIG_9
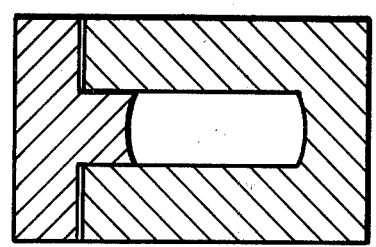
FIG_8
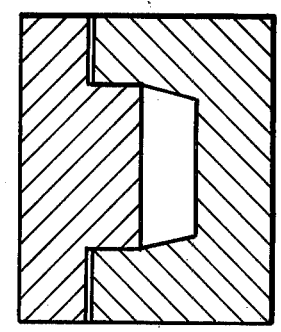
FIG_7
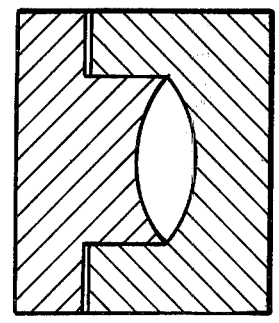
FIG_6

METHOD FOR FORMING TUBESHEETS ON HOLLOW FIBER TOWS AND FORMING HOLLOW FIBER BUNDLE ASSEMBLIES CONTAINING SAME

BACKGROUND OF THE INVENTION

Hollow fibers having semi-permeable walls have been used extensively in recent years in fluid separation processes which separate dissolved components, or solutes from a fluid. Numerous devices which incorporate semi-permeable hollow fibers as the separating membrane have been employed commercially in reverse osmosis and ultrafiltration processes such, for example, as desalinating sea water, separating organic components from fluids, purification and concentration of fruit juices and other food products, etc.

Other devices have employed hollow fibers in industrial dialysis for purifying, separating or concentrating laboratory solutions and even more extensive use has occurred in purifying blood, in hemodialysis in a variety of artificial kidney devices.

All such devices require a multiplicity of hollow fibers, usually thousands of small diameter thin walled fibers, in which the permeable walls perform the separation in the fluid flowing inside, or outside the fibers. To enable the separation, previous devices have enclosed the separating portion of the hollow fibers within a fluid tight chamber which is sealed from an inlet and outlet chamber by a tubesheet or header member. The open ends of the fibers must communicate with the interiors of the inlet and outlet chambers and must be sealed from the separating chamber and from each other within the tubesheet.

Those skilled in the art of fluid separation devices experienced many difficulties and encountered various problems in forming tubesheets which successfully encapsulated and supported each fiber sufficiently to permit the ends to be cut, or shaved to expose an open end of each fiber. Early attempts were made to form tubesheets by dipping or pressure impregnation, with cements or polymeric compositions, of one end of a precut bundle of hollow fibers. Such bundles contained thousands of very small diameter hollow fibers spun from organic polymeric compositions in substantially parallel arrangement with the ends terminating in a common plane. In addition to the difficulty of avoiding rupture or crushing of the delicate thin walls of the fibers while holding them during tubesheet formation the problem of plugging the open fiber ends was encountered. The impregnating tubesheet material entered the bores of the hollow fine fibers and capillary attraction increased penetration of the interiors of the hollow fibers an unacceptable distance because the plugged fibers had to be cut off and discarded. Various attempts were made to avoid plugging including pre-filling the open ends with a fusible material such as wax, or dipping a bundle in a vertical position with a displacing fluid in the fiber bores during dipping, or gas purging through the fibers during the tubesheet cementing, etc.; these procedures were not commercially acceptable.

One commercially used method for forming tubesheets on hollow fibers in artificial kidney devices of the type disclosed in U.S. Pat. No. 2,972,349 and available commercially from Cordis Dow Corporation is disclosed in U.S. Pat. No. 3,442,002. According to the method of U.S. Pat. No. 3,442,002, continuous monofilament hollow fibers are wound into circular hanks consisting of a plurality of fibers; the hanks are flattened to form a bundle having loops of fibers forming the end portions; a plurality of hanks are collected and encased in a surrounding circular jacket which is substantially filled with the hanks of fibers but with the looped ends protruding; a tubesheet mold is placed on each end over the protruding looped fibers and the entire jacket and mold portions are placed in a centrifuge; tubesheet resin is introduced into the molds and the centrifugal force generated by the spinning forces the resin to penetrate the fiber bundle; after the resin solidifies, a transverse cut is made to remove the looped ends of the fibers and expose the open end of the fibers within the tubesheet. It is apparent that this process is complex, is wasteful of the hollow fibers embedded in the discarded end sections, and is not suited for automation to a continuous or semi-continuous operation.

It is therefore the principal object of this invention to provide a process for encapsulating fibers within a tubesheet which overcomes the problems of impregnating pre-cut bundles of hollow fibers and provides a simpler, less expensive alternative to the centrifugal impregnation process of U.S. Pat. No. 3,442,002.

Another important objective of this invention is to provide a semi-continuous, or continuous process of potting continuous tows of hollow fibers to form fiber bundle assemblies comprising a pair of tubesheets axially spaced apart and encapsulating the ends of the intervening tow of fibers.

SUMMARY OF THE INVENTION

A tow comprising a plurality of continuous mono- or multi-filaments or hollow fibers is positioned in the lower portion of a two-part mold and the upper portion is lowered and clamped around the tow. A liquid polymeric composition is flowed into the mold, through the interstices between the fibers and out through the other portion of the mold for a time sufficient to wet the fibers, and fill the interstices and the mold. The polymeric composition which may be thermosetting but preferably is thermoplastic is solidified, and the thus formed tubesheet and the continuous tow is removed from the mold.

Fiber bundle assemblies are formed by transversely cutting through the as-molded tubesheet to form two tubesheets, each of which encapsulates the fibers in the tow to which it is attached and forms one end of a fiber bundle. Repetition of the potting at a second location along the tow and cutting the second formed tubesheet produces fiber bundles in an assembly line manner.

Forming tubesheets in multi-cavity molds, which simultaneously form a pair of separated but closely spaced tubesheets on the tow represent the preferred form of the process; the use of a plurality of multi-cavity molds and cutters mounted on a traveling conveyor which moves with the tow converts the normally semi-continuous process into one which is continuous.

BRIEF DESCRIPTION OF THE DRAWINGS

FIG. 1 is a perspective view illustrating a single cavity mold for forming a tubesheet on a continuous tow of hollow fibers having a preferred configuration.

FIG. 2 is a view, partially in section and partially schematic, showing the mold of FIG. 1 with a hollow fiber tow in position for potting and the path of flow of the polymeric composition to form a tubesheet on the tow.

FIG. 3 is a cross-sectional view of the mold taken along 3—3 of FIG. 1.

FIG. 4 is a view, partly in section, of a modified mold of the type shown in FIG. 1.

FIG. 5 is a schematic view of a multi-cavity mold showing a tow in place in a continuous process of making a preferred form of a fiber bundle assembly.

FIGS. 6–10 are sectional views of mold cavities illustrating alternate shapes of tubesheets which may be made by the practice of the process of this invention.

DETAILED DESCRIPTION

The tubesheets, or potted sections, of this invention are formed on continuous tows of fibers. The expression tow is used herein in its generally understood sense to refer to a plurality, or multiplicity of small continuous filaments linearly arranged in substantially parallel relation. The fibers may be solid or hollow, natural or made from organic polymeric compositions and preferably are hollow semi-permeable fibers of the type that are suitable for dialysis, and more particularly for hemodialysis. Recently composite hollow fibers having a semipermeable membrane coated, or surrounded, by thicker, porous, sorbent portion have been developed and the expression hollow fibers is intended to encompass such composite fibers. Suitable fibers may be made from organic polymeric compositions including cellulose esters such as cellulose acetate, triacetate, formate, proprionate or the like and mixtures thereof; cellulose ethers such as methyl, ethyl, hydroxy-alkyl, carboxy-alkyl or the like and mixtures thereof; regenerated cellulose; polyvinyl alcohols, polyvinyl chloride and its copolymers, acrylic ester polymers, organic silicone polymers, polyurethanes, polycarbonates, synthetic linear polyamides, methacryate polymers, styrene polymers polyvinyl formals and butyrals and mixtures thereof, and the like. For hemodialysis and use in artificial kidneys, cellulose acetate is a particularly advantageous material for conversion into hollow fibers.

Hollow fibers suitable for potting in accordance with this invention are those having dimensions which qualify them for satisfactory use in fluid separation process including reverse osmosis, ultrafiltration, or dialysis. A suitable range of internal diameter is about 50 to about 500 microns with a wall thickness in the range of about five to about eighty microns. For hemodialysis hollow fibers, a preferred range of internal diameter is about 150 to about 300 microns with a wall thickness of about 30 to about 50 microns.

The choice of material for potting the fiber tows to make the tubesheets and fiber bundle assemblies by the practice of this invention is controlled to a large extent by the viscosity characteristics of the selected polymeric composition. The preferred potting compositions are those having a viscosity in the range of about 100 to about 5000 centipoises at a temperature below about 150° C. Generally, the lower viscosity materials more easily wet and completely encapsulate the fibers in the tow and are the most advantageous so long as they provide a fluid tight seal under the contemplated use conditions of temperature and pressure. With this limitation the selected potting composition may be thermosetting or thermoplastic, and preferably is thermoplastic.

Suitable thermosetting materials include phenolaldehyde resins, acrylic resins, polyurethane resins, epoxy resins, thermosetting artificial rubbers and the like. Suitable thermoplastic materials include the acetals, acrylics, cellulosics, fluorocarbons, vinyls, styrenes, polyethylenes, polypropylenes and copolymers and mixtures thereof; particularly useful are the ethylene vinyl acetate copolymers which may be modified with paraffin or the like, and the modified polyethylenes available from Eastman Chemical Products as Epolene waxes. Specific modified compositions using low molecular weight polyethylene resins providing a guide to viscosity variation to assist in selecting the optimum composition for specific end uses are disclosed in U.S. Pat. Nos. 3,428,591 and 3,440,194.

Referring now to the drawings and first to FIGS. 1–3, a potting mold useful in the practice of a preferred embodiment of this invention is shown. The mold shown in FIG. 1, generally designated 10 consists of a lower potting mold portion 12 flanked by contiguous fiber clamping and cooling portions 16, 18, portions 12, 16 and 18 being rigidly secured together and to a rigid base support by means not shown; and an upper potting mold portion 14 flanked by contiguous fiber clamping and cooling portions 24, 26, portions 14, 24 and 26 being rigidly secured together by means not shown. The upper half of mold assembly 10 is vertically movable relative to the fixed lower half to enable positioning of fiber tow 32 in place for potting, as shown in FIG. 2, and to a raised, open position to permit removal of a solidified tubesheet by conventional means not shown. Cooling portions 16, 18 and 24, 26, respectively, are separated from lower and upper mold contiguous portions 12, 14 by insulator sheets 20, 22 and 28, 30, respectively, for purposes which will be explained hereinafter. Sheet insulator 31 separates the upper and lower halves of mold assembly 10.

FIber tow 32 is clamped between the upper and lower portions of mold assembly 10 when the upper half 14, 24, 26 is moved downwardly into closed position as may be seen in FIGS. 1 and 2. Tow 32 which is supported on surface 34 is compressed and clamped by the downward pressure exerted by arcuate surface 36 of tongue 38 as the mold is closed, under pressure. Tow 32 is slightly gathered at the side portions 40, 42 of tongue 38 due to the smaller radius of curvature of arcuate surface 36 relative to the corresponding arcuate surface in potting mold portion 14 as may be seen in FIG. 2 at 44. The tubesheet mold cavity in lower potting mold portion 12 is also defined by a surface 46 which is slightly lower than support surface 34 in adjacent fiber clamping portion 16, 18. The difference in the level of support surface 46 and 34 is visible in FIG. 2 at 48 and it should be noted that ledges 48 and 49 are not separated from the mold cavity by insulators 20 nor 22.

As may be seen in FIGS. 2 and 3 upper fiber clamping and cooling portions 24, 26 are provided with interior cooling passageways 50, 52 which generally follow their lower surface contours and lie in close adjacency to the upper extremity of arcuate surface 36. In similar fashion lower fiber and cooling portions 16, 18 are provided with interior cooling passageways 54, 56, respectively. In use, cooling passageways 50, 52, 54 and 56 are connected to a source of chilled water, or other coolant, not shown.

Upper potting mold 14 and lower mold 12 are provided with interior heating and cooling passageways 58, 60 and 62, 64, respectively, which are parallel to and follow a similar path to the corresponding cooling passageways 50–56. Passageways 50, 60, 62, 64 are connected to sources of both steam and chilled water with the necessary valves to permit alternate heating and cooling as desired, by means not shown. A potting resin supply tank 66 is connected with supply inlet 68 which feeds heated liquid potting resin to header 70 and thence into the lower surface through a plurality of axially spaced rows of aperatures 72, 74, 76 and 78. Potting resin flows upwardly until it reaches surface 44 and flows out of the mold cavity through ports 80, 82, through header 84, outlet pipe 86 and back through line 88 to supply tank 66 for recirculation by suitable means, not shown. For thermoplastic potting compositions, tank 66 is preferably open to atmosphere and thus the pressure within potting mold 12, 14 during potting is substantially atmospheric pressure. Pressure may be used, however, if needed.

Successful potting of tow 32 requires that the molten potting resin penetrate the interstices between each of the fibers in the tow and wet their surfaces and fill the entire mold cavity in order to encapsulate the fibers and form a solid, void-free tubesheet. Moreover it is necessary to prevent wicking of the potting resin axially along tow 32 as potting resin flows into and through the fibers and mold. Wicking refers to potting resin which moves axially along the fibers and solidifies in the interstices between fibers beyond a small distance from the axial edges of potting mold portions 12, 14 such as illustrated by dotted lines 90, 92 in FIG. 2; it is undesirable because it decreases the effective semi-permeable wall area for fluid separation, and in hemodialysis prevents effective and uniform fiber penetration by a dialysate solution when the fiber bundle is incorporated into an artificial kidney.

Wicking was found to be a substantial problem in the early trials which preceded the successful performance of the method of this invention. Various unsuccessful attempts were made to block resin flow between the fibers including increasing clamping pressure on the tow particularly at the axial mold edges, but it was found to be impossible to prevent wicking by pressures which did not crush the hollow fibers. The problem was solved by providing cooling mold sections immediately adjacent to the axial edge surface of the potting mold and maximizing the temperature differential between the necessarily hot potting mold wall and the adjacent wall of the cooling mold portion. Thin insulator sheets between potting and cooling mold portions, except in the areas 48, 49, was found to produce the necessary difference in temperature to chill, and thus solidify, a thin substantially vertical edge portion of the heated, liquid resin entering the mold cavity through apertures 72, 74, 76, 78 and moving upwardly through the fibers and in the mold. The necessary insulation may be obtained with any of a number of insulating materials including mica, mesh asbestos or cloth, tetrafluoroethylene film or cloth, aluminum, silicone rubber or air. An edge spacer, or a thin surface undercut on the adjacent axial surfaces of either the potting or cooling mold portion, may be satisfactorily used; direct circulation of the cooling fluid in an undercut chamber, isolated from communication with the mold cavity may be used with potting resins having high melt temperatures.

The potting method of this invention also requires that longitudinal dimension along the fibers, or the axial dimension, of the potted, solid tubesheet be sufficient to permit transverse cutting through the formed tubesheet and encapsulated fibers to form two tubesheets presenting on the cut, or shaved, surface open fiber lumens terminating in a planar void-free surface, in accordance with the disclosure of application Ser. No. 805,601 filed concurrently with this application. Thermoplastic potting resins, after flowing through the fibers positioned in the mold of FIG. 2 for a time sufficient to wet and encapsulate the fibers, fill the interstices and the mold were found to shrink during solidification and create an internal void at some location within the tubesheet. This void created an unacceptable crater in the planar surface resulting from the transverse cut when the void was located in the internal central area of the formed tubesheet. In accordance with one modification of this invention, such voids are eliminated by the use of the modified mold shown in FIG. 4.

The mold shown in FIG. 4 is identical to the mold shown in FIGS. 1-3, and similar parts bear like numbers, except that it includes a supplementary potting resin tank 94 mounted on outlet pipe 86 and insulated from mold 14 by depressed opening 87. Tank 94 is heated by heater means 96 and supplied with potting resin from supplemental resin tank 98 through pipe 100, as needed. Tank 94 serves as the overflow tank for excess potting resin from potting mold 12, 14 and maintains communication with the upper surface of the mold cavity through exit ports 80, 82 during potting and during cooling. At the end of the flow-through encapsulation of the tow fibers, the cooling cycle is started. Steam supply to heating passageways 62, 64 is stopped and cooling water flow in those passageways is commenced. Solidification of the molten potting resin proceeds inwardly from all cooled surfaces and with the steam supply to passageways 58, 60 reduced, but continued, the upper portion of the tubesheet remains molten. The central internal area within the tubesheet thus becomes the last location to solidify and needed additional molten potting resin to fill any void resulting from shrinkage becomes filled as the hot resin from tank 94 flows in to fill any available volume which might otherwise develop as steam supply to passageways 58, 60 is terminated and last stage cooling occurs. The solidified tubesheet, thus produced, is sound and void-free and suitable for transverse cutting in the central axial area to produce the two useful tubesheets attached to a portion of the tow.

The most advantageous form of the process of this invention permits the simultaneous potting of a plurality of tubesheets in spaced apart pairs separated by a short axial length of the continuous tow 32. This form of the process will now be described by reference to the mold and tow which is schematically shown in FIG. 5. The mold generally designated 102 is identical in internal construction to the mold of FIGS. 1-3 and differs only in having two potting mold portions 104, 106. Each mold 104, 106 is contiguous to a fiber clamping and cooling mold portion 108 and 110 on the axial edges and a common separating portion 112 which provides cooling to the inner edge surfaces of each of the potting molds. Heated potting resin is supplied simultaneously through common supply line 114 and the excess is collected and returned to the resin source through common line 116. In practicing the process potting molds 104, 106 are, under preferred operating conditions, heated to approximately 125° C.–150° C. with a tow consisting of about 8,000 to 9,000 hollow cellulose acetate fibers clamped in position by clamping molds, 108, 110, 112, as above described. A hot melt adhesive available from H. B. Fuller Company under the designation HM 727 and understood to be a modified ethylene-vinyl acetate copolymer is heated to about 125° C. and at this temperature has a viscosity of about 4,000 centipoises;

the heated HM 727 resin is flowed upwardly through mold 102, at the rate of about ten milliliters per minute for approximately 20 minutes, the overflow being returned to the heated resin tank, at atmospheric pressure. Steam supply is then stopped to all steam ports and cooling water flow is started. After 5 to 10 minutes the molds are separated and the formed tubesheets are removed and tow 32 is advanced the desired distance to form the next pair of tubesheets such as these illustrated in FIG. 5 at 118, 120. A fiber bundle, indicated in its entirety as 124, is formed by making a single transverse cut along line 126. A second transverse cut along line 128 separates discardable short section 130 of tow 32 which occupied the space within cooling mold 112 during potting. This cut produces tubesheet 118 which forms the end portion of the next fiber bundle which will result from a repetition of the steps just described.

It will be apparent that a plurality of molds 102 may be located along a fiber tow line at spaced locations equal to the spacing necessary to produce a plurality of pairs of tubesheets simultaneously to thereby increase the rate of production. It will also be understood that a plurality of multi-cavity molds, like 102, may be mounted on a conveyor adapted to advance along the line of tow 32, and with associated cut-off apparatus, thereby convert the described semi-continuous process into one which is continuous.

FIGS. 6 through 10 illustrate a variety of mold cavity configurations which may be employed to produce tubesheets in accordance with the method of this invention and are to be understood to be illustrative only.

What I claim is:

1. A method for forming a tubesheet encapsulating a multiplicity of fibers in linearly arranged continuous tow form which comprises the steps of
   (1) positioning a tow of fibers in a mold, said tow comprising a multiplicity of linearly arranged fibers,
   (2) flowing a polymeric composition into said mold and through the interstices between said fibers in a direction substantially at a right angle to the longitudinal axis of said linearly arranged fibers and in a quantity and for a time sufficient to fill the interstices between said fibers and to fill said mold,
   (3) causing said polymeric composition to solidify adjacent to the axial ends of said mold while said polymeric composition continues to flow across said fibers and to solidify and encapsulate said fibers therein to thereby form a tubesheet having the external configuration of the cavity of said mold, and
   (4) removing said tubesheet from said mold.

2. A method in accordance with claim 1 wherein said fibers are hollow.

3. A method in accordance with claim 2 wherein said flowing polymeric composition is a low viscosity liquid.

4. A method in accordance with claim 2 wherein said polymeric composition is substantially prevented from flowing out of said mold axially along said hollow fibers.

5. A method in accordance with claim 2 wherein said polymeric composition is thermosetting.

6. A method in accordance with claim 2 wherein said polymeric composition is thermoplastic.

7. A method in accordance with claim 6 wherein said thermoplastic composition is a low viscosity liquid which is caused to flow upwardly through the interstices between said fibers in a quantity in excess of the amount required ot fill the interstices between said fibers and to fill said mold.

8. A method in accordance with claim 7 wherein said upward flow of said low viscosity thermoplastic liquid is continued for a time sufficient to eliminate voids in the interstices between said fibers and in said polymeric composition filling said mold.

9. A method for forming a tubesheet encapsulating a multiplicity of hollow fibers in linearly arranged continuous tow form which comprises the steps of
   (1) providing a mold assembly comprising a mold portion having a preselected internal configuration and inlet means in a first portion thereof for introducing a liquid polymeric composition into said mold and outlet means in a second portion thereof for flow of said polymeric composition out of said mold, and combination fiber-clamping and cooling portions contiguous to each of the axial surfaces of said mold,
   (2) positioning a tow of hollow semi-permeable fibers in said mold assembly and clamping said tow therein,
   (3) while concurrently heating said mold portion and cooling said combination fiber-clamping and cooling portions of said mold assembly flowing a polymeric composition into said mold and through the interstices between said fibers in a direction substantially at a right angle to the longitudinal axis of said linearly arranged fibers and in a quantity and for a time sufficient to fill the interstices between said fibers and to fill said mold,
   (4) causing said polymeric composition to solidify adjacent to the axial ends of said mold while said polymeric compositions continues to flow across said fibers and to solidify and encapsulate said fibers therein to thereby form a tubesheet having the external configuration of the cavity of said mold, and
   (5) removing said tubesheet from said mold.

10. A method in accordance with claim 9 wherein said composition is a low viscosity thermoplastic liquid which is caused to flow through the interstices between said fibers in a quantity in excess of the amount required to fill the interstices between said fibers and to fill said mold.

11. A method in accordance with claim 9 wherein said polymeric composition is substantially prevented from flowing out of said mold axially along said fibers in said tow.

12. A method for forming a pair of tubesheets on a tow of semi-permeable hollow fibers and encapsulating the multiplicity of fibers in said tow which comprises the steps of:
   (1) positioning a tow of hollow semi-permeable fibers in a mold, said tow comprising a multiplicity of semi-permeable, linearly arranged hollow fibers,
   (2) flowing a polymeric composition into said mold and through the interstices between said fibers in a direction substantially at a right angle to the longitudinal axis of said linearly arranged fibers and in a quantity and for a time sufficient to fill the interstices between said fibers and to fill said mold,
   (3) causing said polymeric composition to solidify adjacent to the axial ends of said mold while said polymeric composition continues to flow across said fibers and to solidify and encapsulate said fibers therein to thereby form a tubesheet having the external configuration of the cavity of said mold, (4) removing said tubesheet from said mold, and
(5) transversely cutting through said tubesheet and the hollow fibers therein at a location between the axial end surfaces of said tubesheet which provides surfaces on the plane of said cut that are substantially free of voids to thereby form a pair of cut tubesheets defining the end portions of hollow fibers encapsulated by each said cut tubesheet.

13. A method in accordance with claim 12 wherein said solidified tubesheet formed in step 3 has an axial dimension greater than twice the sum of the axial dimensions of each of said pair of cut tubesheets formed in step 5.

14. A method for forming an improved hollow fiber bundle assembly comprising a tow of semi-permeable hollow fibers and a pair of spaced apart tubesheets thereon forming the end portions thereof, said tubesheets encapsulating and sealing therewithin the multiplicity of hollow fibers in said tow which comprises the steps of
   (1) positioning a tow of hollow semi-permeable fibers in a mold, said tow comprising a multiplicity of semi-permeable, linearly arranged hollow fibers,
   (2) flowing a polymeric composition into said mold and through the interstices between said fibers in a direction substantially at a right angle to the longitudinal axis of said linearly arranged fibers and in a quantity and for a time sufficient to fill the interstices between said fibers and to fill said mold,
   (3) Causing said polymeric composition to solidify adjacent to the axial ends of said mold while said polymeric composition continues to flow across said fibers and to solidify and encapsulate said fibers therein to thereby form a first tubesheet having the external configuration of the cavity of said mold,
   (4) removing said tubesheet from said mold and repositioning said tow in said mold at a location axially spaced along said tow from the said first tubesheet,
   (5) repeating steps 2 and 3 to thereby form a second tubesheet, and
   (6) transversely cutting through said first and said second tubesheets and the hollow fibers therein at a location between the axial end surfaces of each said first and said second tubesheets that are substantially free of voids in the planes of said cuts to thereby form said hollow fiber bundle assembly.

15. A method in accordance with claim 14 wherein said first and said second tubesheet each has an axial dimension greater than twice the sum of the axial dimension of the two tubesheets which are formed by the said transverse cuts in step 6.

16. An assembly line method for forming hollow fiber bundle assemblies, each assembly comprising a tow containing a multiplicity of linearly arranged fibers and a pair of tubesheets longitudinally spaced apart on said tow encapsulating the fibers therein and forming the end portions thereof which comprises the steps of
   (1) providing a continuous tow of fibers comprising a multiplicity of fibers linearly arranged in substantially parallel array,
   (2) providing a mold assembly comprising a plurality of tubesheet mold portions adapted to form tubesheets therein encapsulating said fiber tow, adjacent mold portions being axially spaced apart by an intervening cooling portion and having a cooling portion contiguous to each axial surface thereof, inlet and outlet means in each said mold portion for feeding a liquid polymeric composition into and from said mold,
   (3) positioning said tow in said mold assembly and clamping said tow therein,
   (4) flowing a heated liquid polymeric composition through said inlet means into said mold portions in a direction substantially at a right angle to the longitudinal axis of said linearly arranged fibers and in a quantity and for a time sufficient to fill the interstices between said fibers and to fill the cavities in said mold portions,
   (5) causing said polymeric composition to solidify adjacent to the axial ends of said mold while said polymeric composition continues to flow across said fibers and to solidify and encapsulate said fibers therein to thereby form a tubesheet in each said mold portion,
   (6) removing said tubesheets from said mold assembly, and
   (7) transversely cutting through each said tubesheet and said fibers encapsulated therein on a plane adjacent to each of the axial end surfaces of each said tubesheet to thereby form a plurality of said fiber bundle assemblies.

17. A method in accordance with claim 16 wherein said mold assembly consists of two mold portions.

18. A method in accordance with claim 16 wherein said polymeric composition is thermoplastic.

* * * * *